United States Patent Office 2,770,713
Patented Nov. 13, 1956

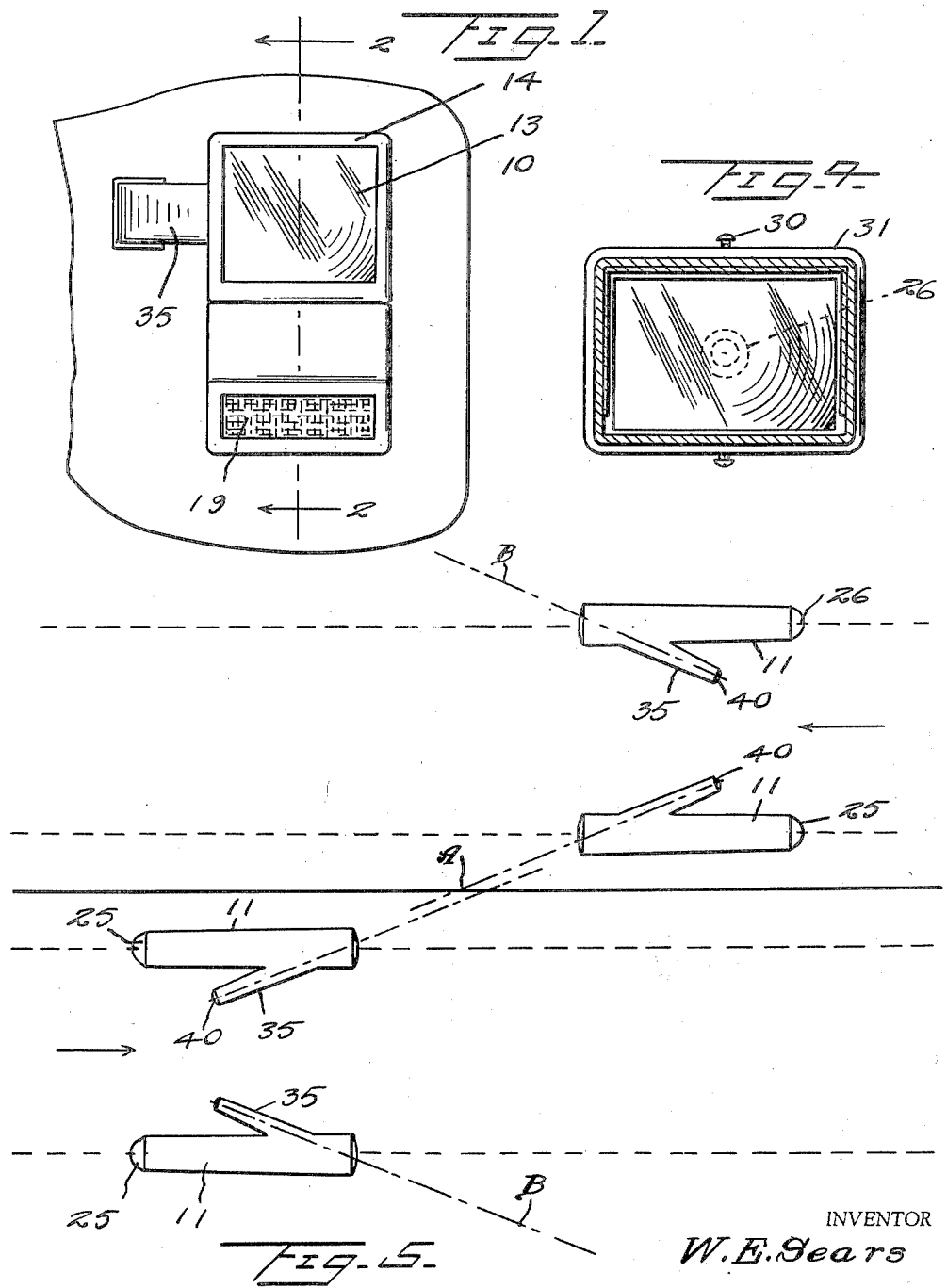

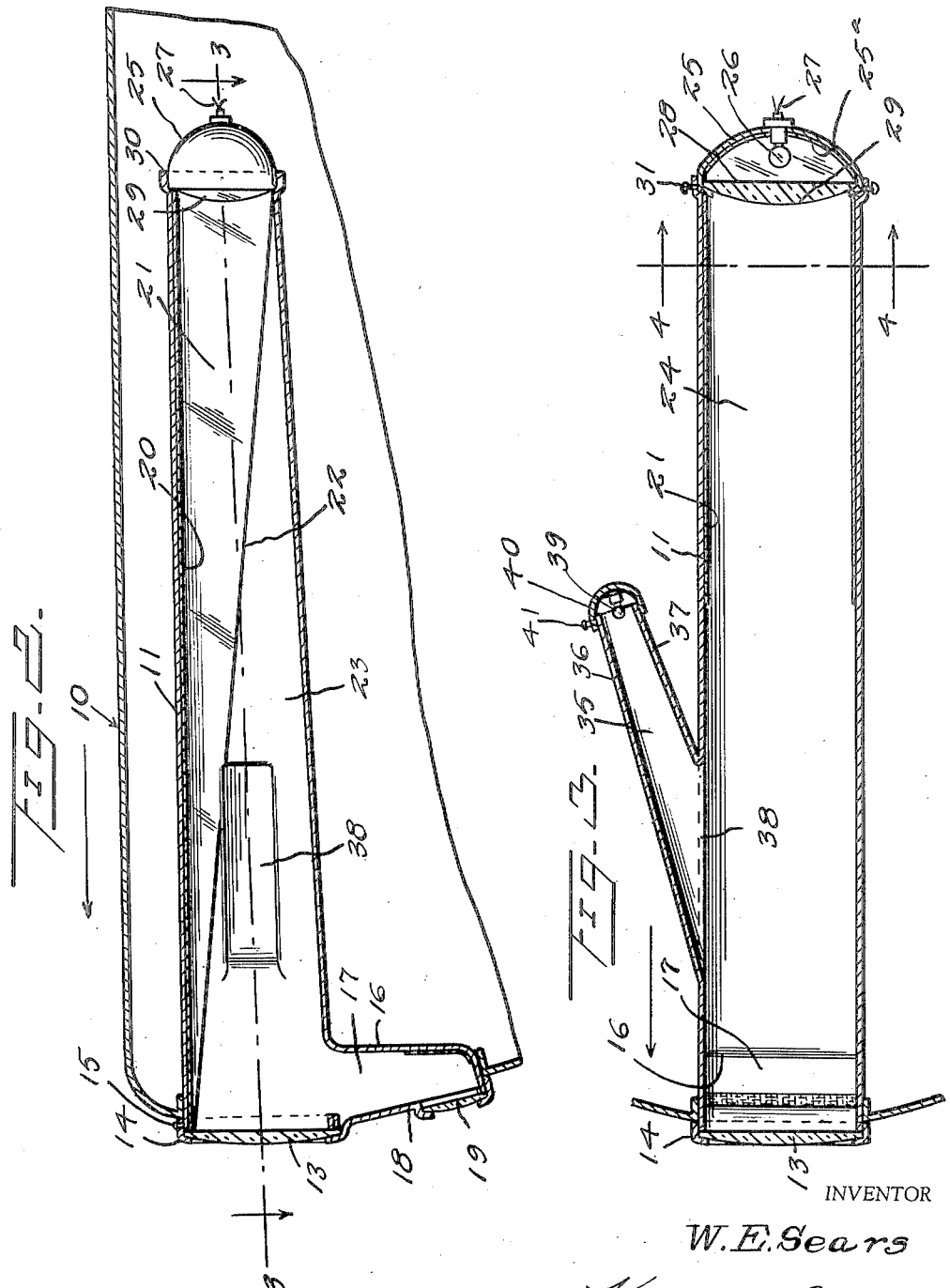

2,770,713

VEHICLE HEADLIGHT

Wesley Earl Sears, McKee, Ky.

Application March 5, 1954, Serial No. 414,441

1 Claim. (Cl. 240—7.1)

This invention relates to a vehicle headlight and more particularly to a headlight particularly adapted to preclude glare on the highway and in an oncoming driver's eyes.

A primary object of the invention is the provision of a headlight of this nature which will afford adequate illumination and safe driving and yet which will not be directed to the eyes of an oncoming driver.

A further object of the invention is the provision of such a headlight which will adequately illuminate both the center of the road and the side thereof, but will not be directed straight in advance of the vehicle.

Still another object is the provision of such a light which is particularly useful during fog or similar conditions for illuminating portions of the road normally invisible.

Still other objects of the invention reside in the combination of elements, arrangement of parts, and features of construction, all as will be more fully pointed out hereinafter and disclosed in the accompanying drawings wherein there is shown a preferred embodiment of this inventive concept.

In the drawings:

Figure 1 is a front plan view of one form of vehicle headlight embodying features of the instant invention.

Figure 2 is a sectional view taken substantially along the line 2—2 of Figure 1, as viewed in the direction indicated by the arrows.

Figure 3 is a sectional view taken substantially along the line 3—3 of Figure 2, as viewed in the direction indicated by the arrows.

Figure 4 is a sectional view taken substantially along the line 4—4 of Figure 3, as viewed in the direction indicated by the arrows.

Figure 5 is a diagrammatic view showing the direction of the light beams as emanating from the light of the instant invention.

Similar reference characters refer to similar parts throughout the several views of the drawings.

Having reference now to the drawings, and more particularly to Figures 1, 2, and 3, there is generally indicated at 10 the fender of a motor vehicle such as a conventional automobile in the illustrative embodiment shown this being the left fender. It will be understood that the right fender and its associated headlight are substantially identical thereto except for the opposite arrangement of parts.

Positioned interiorly of the fender is a tunnel or tube 11, in the instant case this being of rectangular cross section, although it may be circular or other shape if desired. At one end of the tube 11, exteriorly of the fender, there is provided a clear glass lens 13 which may be provided with the conventional chrome binding 14 and which is removable for replacement in a conventional manner as by means of screws 15.

Directly to the inside of lens 13, the tunnel 11 is provided with a depending portion 16 forming a recess 17 at the lower end of which, and extending through the fender, is an aperture 18 which may be provided with a downwardly directed lens 19 which may, if desired, be of colored glass, as for example, a yellow glass, for directing a dim beam directly on the road immediately in front of the vehicle.

As best shown in Figure 2, the top of tunnel 11 is preferably comprised of reflecting material 20 for directing the beams of light, from a source to be described hereinafter, downwardly through the lens 13, and angularly disposed portions of the side of the tube 21 are also formed of reflecting material.

A line 22 extending diagonally from one end of the tube at its lower extremity to the lower or outer end of the upper extremity divides the side walls between reflecting portions 21 and non-reflecting portions 23, it being understood that the bottom 24 is also of non-reflecting material.

At the rear end of the tube or tunnel 11 there is positioned a suitable reflector element 25 containing a conventional bulb 26 supplied with current through wires 27 and having a conventional clear glass lens 28 and magnifying lens 29, the assembly being held in place by a rim 30, releasable by means of screws 31 from the inside of the vehicle hood to permit replacement of the bulb or the like. Light source 26 is of conventional design and serves under normal circumstances as a headlight for the vehicle, and, if desired, a conventional dimmer may be employed.

Opening into one side of tunnel 11 is an angularly disposed tunnel 35 including diverging side walls 36 and 37 and opening as at 38 into the main tunnel 11 in a direction inclined upwardly and outwardly.

A second source of illumination or bulb 39 is provided with a reflector housing 40 at the inner end of tunnel 35 and the bulb 39 may also be replaced by means of screws 41 when it becomes necessary.

In the use and operation of the device, when an oncoming vehicle is sighted it is desirable that the bulbs 26 be turned off, simultaneously with the illumination of the bulbs 39 whereupon the light beams will be directed in the manner indicated in the diagram of Figure 5, the beam from the bulb 39 on the right side of the vehicle extending a suitable distance in a downward direction toward the side of the road. It has been found in many instances that twenty-five to thirty feet is a suitable distance for this purpose.

Similarly, the beam from the left fender will be directed downwardly and inwardly toward the center of the road for a similar distance, and all glare will be obviated. The beams from the adjacent left fender from oncoming vehicles will intersect at about twenty-five feet distance and will serve adequately to illuminate the oncoming car without in any way directing any glare to the eyes of the driver of the oncoming vehicle. Similarly the sides of the road will at all times be illuminated, as indicated at B, in such manner as to obviate a possibility of going off the side due to poor visibility.

Under conditions of thick fog or on a clear road it will be readily apparent that the bulbs 26 may be illuminated and the bulbs 39 additionally illuminated to provide added wide radius lights which will illuminate the road to a greater extent and to a wider area during fog or the like condition which impairs visibility.

It is to be noted that when the main lights are out, moderate illumination directly in front of the vehicle will be provided through the color lens 19 which is, however, downwardly directed to such an extent to preclude any possible glare to the eyes of the driver of an oncoming vehicle.

The lower portion of reflector 25 may be made non-reflecting as indicated at 25a so that no glaring rays will strike the eyes of a driver of an oncoming vehicle, and bulb 26 may be adjusted so that the bright rays will strike the road at a safe driving distance.

From the foregoing it will now be seen that there is herein provided an improved vehicle headlight which accomplishes all the objects of this invention, including the preclusion of the possibility of any glare sufficient to impair the vision of the driver of an approaching vehicle, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

In a vehicle headlight system of the type having dual head lamps, a construction for each of said head lamps comprising, an elongated substantially rectangular hollow first tunnel having parallel side walls and rearwardly converging top and bottom walls, said tunnel having its axis extending parallel to the axis of the vehicle, said tunnel having the opposite ends thereof open, a second tunnel having parallel top and bottom walls and rearwardly converging side walls secured to a side wall of said first tunnel at the forward end thereof and communicating with said first tunnel with the axes of said tunnels extending at an acute angle with respect to each other, a source of light detachably secured to the rear end of each of said tunnels, a lens detachably secured to the forward end of said first tunnel, said first tunnel being substantially longer than said second tunnel with the light rays from each of said tunnels passing through said lens, a second lens positioned below said first lens, and reflector means depending from the bottom wall of said first tunnel rearwardly of said second lens for reflecting a portion of the light from each of said light sources through said second lens.

References Cited in the file of this patent

UNITED STATES PATENTS

| | | |
|---|---|---|
| 1,138,712 | Wright | May 11, 1915 |
| 1,154,824 | Wilson | Sept. 28, 1915 |
| 1,328,692 | Richard | Jan. 20, 1920 |
| 1,428,662 | Ryan | Sept. 12, 1922 |
| 1,884,265 | Rush | Oct. 25, 1932 |
| 1,961,836 | Warner | June 5, 1934 |
| 2,027,690 | Horgan | Jan. 14, 1936 |

FOREIGN PATENTS

| | | |
|---|---|---|
| 629,530 | France | July 26, 1927 |